United States Patent
Koros et al.

(10) Patent No.: US 6,503,295 B1
(45) Date of Patent: Jan. 7, 2003

(54) GAS SEPARATIONS USING MIXED MATRIX MEMBRANES

(75) Inventors: William J. Koros, Austin, TX (US); De Q. Vu, Austin, TX (US); Rajiv Mahajan, Austin, TX (US); Stephen J. Miller, San Francisco, CA (US)

(73) Assignees: Chevron U.S.A. Inc., San Ramon, CA (US); The University of Texas System, Austin, TX (US)

( * ) Notice: Subject to any disclaimer, the term of this patent is extended or adjusted under 35 U.S.C. 154(b) by 0 days.

(21) Appl. No.: 09/666,392

(22) Filed: Sep. 20, 2000

(51) Int. Cl.[7] ............................................. B01D 53/22

(52) U.S. Cl. ..................... 95/51; 95/45; 95/54; 96/4; 96/10; 96/11

(58) Field of Search ............................. 95/45–54; 96/4, 96/8, 10, 11; 55/524, DIG. 5

(56) References Cited

U.S. PATENT DOCUMENTS

| | | |
|---|---|---|
| 3,457,170 A | 7/1969 | Havens |
| 3,567,632 A | 3/1971 | Richter et al. |
| 3,862,030 A | 1/1975 | Goldberg |
| 3,878,104 A | 4/1975 | Guerrero |
| 3,911,080 A * | 10/1975 | Mehl et al. ................. 95/45 X |
| 3,993,566 A | 11/1976 | Goldberg et al. |
| 4,032,454 A | 6/1977 | Hoover et al. |
| 4,061,724 A | 12/1977 | Grose et al. |
| 4,208,194 A * | 6/1980 | Nelson ............................ 96/4 |
| 4,230,463 A | 10/1980 | Henis et al. |
| 4,261,832 A * | 4/1981 | Schumacher et al. ........ 96/4 X |
| 4,341,605 A | 7/1982 | Solenberger et al. |
| 4,685,940 A | 8/1987 | Soffer et al. |
| 4,690,873 A | 9/1987 | Makino et al. |
| 4,728,345 A | 3/1988 | Murphy |
| 4,740,219 A | 4/1988 | Kulprathipanja et al. |
| 4,925,459 A | 5/1990 | Rojey et al. |
| 5,085,676 A | 2/1992 | Ekiner et al. |
| 5,104,425 A * | 4/1992 | Rao et al. ....................... 95/47 |
| 5,104,532 A | 4/1992 | Thompson et al. |
| 5,127,925 A | 7/1992 | Kulprathipanja et al. |
| 5,234,471 A | 8/1993 | Weinberg |
| 5,288,304 A | 2/1994 | Koros et al. |
| 5,431,864 A * | 7/1995 | Rao et al. .................... 96/11 X |
| 5,772,735 A * | 6/1998 | Sehgal et al. .................. 95/45 |
| 6,004,374 A * | 12/1999 | Rao et al. ....................... 95/52 |
| 6,299,669 B1 * | 10/2001 | Koros et al. .................... 95/51 |

FOREIGN PATENT DOCUMENTS

EP 0459623 A1 4/1991

OTHER PUBLICATIONS

Breck, D., "Absorption by dehydrated Zeolite Crystals", Chapter 8, *Zeolite Molecular Sieves*, (A Wiley–Interscience Publication, John Wiley & Sons, N.Y.) 8:593–724, 1974.

Costello, L. and Koros, W. J., "Separations–Temperature Dependence of Gas Sorption & Transport Properties in Polymers: Measurement and Applications," *Ind. & Eng. Chem. Res.*, (Am. Chem. Soc., Washington, D.C.) 31: 2708–2714, 1992.

Duval, et al., "Adsorbent filled membranes for gas separation. Part 1. Improvement of the gas separation properties of polymeric membranes by incorporation of microporous absorbents*", *J. Mem. Sci.*, (Elsevier Sci. Pub., Amsterdam) 80: 189–198, 1993.

Duval, D. et al., "Preparation of Zeolite Filled Glassy Polymer Membranes," *J. Applied Polymer Sci.* (Elf Aquitaine, Fr.) 54: 409–418, 1994.

Gür, T., "Permselectivity of Zeolite Filled Polysulfone Gas Separation Membranes," *J. Mem. Sci.* (Elsevier Sci. Pub.) 93: 283–289, 1994.

Jia, M., et al., "Molecular Sieving Effect of the Zeolite–filled Silicone rubber Membranes in Gas Permeation," *J. Mem. Sci.* (Elsevier Sci. Pub., Amsterdam) 57: 289–296, 1991.

Koros, W., et al., "Membrane–Based Gas Separation", *J. Mem. Sci.*, (Elsevier Sci. Pub., Amsterdam) 83: 1–80, 1993.

O'Brien, K., et al., "A New Technique for the Measurement of Multicomponent Gas Transport Trhough Polymeric Films," *J. Mem. Sci.* (Elsevier Sci. Pub., Amsterdam) 29: 229–238, 1986.

(List continued on next page.)

*Primary Examiner*—Robert H. Spitzer
(74) *Attorney, Agent, or Firm*—Richard J. Schulte

(57) ABSTRACT

Mixed matrix membranes capable of separating carbon dioxide from mixtures including carbon dioxide and methane, and processes for purifying methane using the membranes, are disclosed. The membranes are polymer membranes with a selective layer thickness of between about 1000 Angstroms to about 0.005 inch, that include discrete carbon-based molecular sieve particles with sizes of between about 0.5 microns to about 5.0 microns. The preferred ratio of particles to polymer is about 20% to about 50% by volume. A preferred method for preparing the mixed matrix membrane is by dispersing the particles in a solvent, adding a small quantity of the desired polymer or "sizing agent" to "size" or "prime" the particles, adding a polymer, casting a film of the polymer solution, and evaporating the solvent to form a mixed matrix membrane film. The mixed matrix membrane film permits passage of carbon dioxide and methane, but at different permeation rates, such that the ratio of the relative permeation rates of carbon dioxide to methane is larger through the mixed matrix membrane film than through the original polymer. The polymer is preferably a rigid, glassy polymer, more preferably, with a glass transition temperature above about 150° C. The mixed matrix membrane is preferably in the form of a dense film or a hollow fiber. A mixture containing carbon dioxide and methane can be enriched in methane by selective passage of carbon dioxide over methane in a gas-phase process through the membrane.

21 Claims, 1 Drawing Sheet

OTHER PUBLICATIONS

Paul, D., and Kemp, D. R., "The Diffusion Time Lag in Polymer Membranes Containing Adsorptive Fillers," *J. Polymer Sci.* (Wiley–Interscience Pub., John Wiley & Sons, N. Y.) 41: 79–93, 1973.

Prasad, R., et al., "Evolution of Membranes in Commercial Air Separation," *J. Mem. Sci.* (Elsevier Sci. Pub., Amsterdam) 94: 225–248, 1994.

Süer, M., et al., "Gas Permeation Characteristics of Polymer–Zeolite Mixed Matrix Membranes," *J. Mem. Sci.* (Elsevier Sci. Pub., Amsterdam) 91: 77–86, 1994.

Süer, M., et al., "Gas Separation with Zeolite Based Polyethersulfone Membranes," $3^{rd}$ *International. Sym. on Separation Tech.* (Elsevier Sci. Pub., Amsterdam) 661–669, 1994.

Zimmerman, C., et al., "Tailoring Mixed Matrix Composite Membranes for Gas Separations," *J. Mem. Sci.* (Elsevier Sci. Pub., B.V.) 137:145–154, 1997.

* cited by examiner

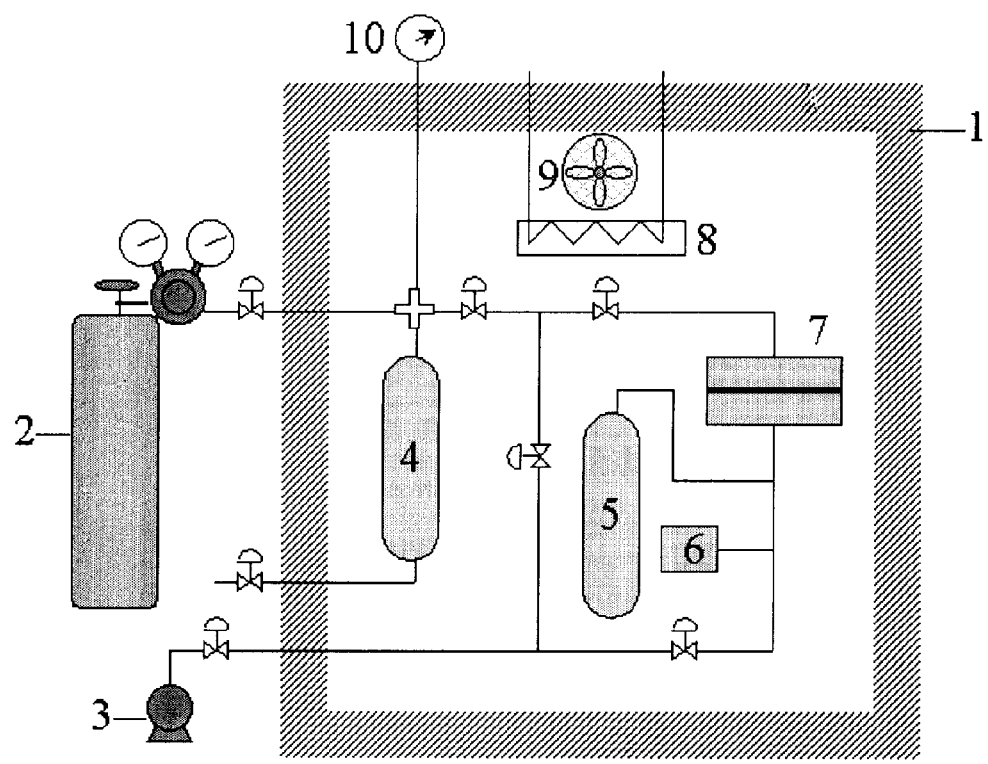
FIGURE 1. Schematic of gas permeation apparatus for flat membrane films

GAS SEPARATIONS USING MIXED MATRIX MEMBRANES

FIELD OF THE INVENTION

The present invention relates to separation membranes with the ability to separate a desired gaseous component from gaseous mixtures including the desired component and other gaseous components.

BACKGROUND OF THE INVENTION

Fischer-Tropsch synthesis is used to convert methane to higher molecular weight hydrocarbons. The first step involves converting the methane to synthesis gas, which is a mixture of carbon monoxide and hydrogen. The synthesis gas is contacted with a Fischer-Tropsch catalyst under conditions of increased temperature and pressure. In addition to desired products, the reaction can also produce methane and carbon dioxide. The methane can be recycled through the synthesis gas generator, but over time, each recycle can lead to increased levels of carbon dioxide. The increased levels of carbon dioxide can adversely affect the Fischer-Tropsch synthesis. It would be advantageous to separate and remove the carbon dioxide from the methane.

Polymeric membrane materials have been proposed for use in gas separation. Numerous research articles and patents describe polymeric membrane materials (e.g., polyimides, polysulfones, polycarbonates, polyethers, polyamides, polyarylates, polypyrrolones, etc.) with desirable gas separation properties, particularly for use in oxygen/nitrogen separation (See, for example, Koros et al., *J. Membrane Sci.*, 83, 1–80 (1993), the contents of which are hereby incorporated by reference, for background and review).

The polymeric membrane materials are typically used in processes in which a feed gas mixture contacts the upstream side of the membrane, resulting in a permeate mixture on the downstream side of the membrane with a greater concentration of one of the components in the feed mixture than the composition of the original feed gas mixture. A pressure differential is maintained between the upstream and downstream sides, providing the driving force for permeation. The downstream side can be maintained as a vacuum, or at any pressure below the upstream pressure.

The membrane performance is characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity can be defined as the ratio of the permeabilities of the gas components across the membrane (i.e., $P_A/P_B$, where A and B are the two components). A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

Various materials (fibers, porous supports, etc.) have been incorporated into polymeric membranes to provide mechanical strength to the membranes. Such materials and the resulting composites are described, for example, in U.S. Pat. Nos. 3,457,170; 3,878,104; 3,993,566; 4,032,454; and 4,341,605. Some composite materials show improved liquid separation properties over the polymer material themselves. For example, U.S. Pat. No. 3,862,030 discloses a composite material that includes inorganic fillers within a polymeric matrix that shows enhanced filtering capabilities for microscopic, submicron particles.

Membrane materials with incorporated materials within a polymeric matrix have also been used for gas separations (see, for example, Zimmerman et al., *J. Membrane Sci.*, 137, 145–154 (1997)). Paul and Kemp (*J. Polymer Sci.*, Symposium No. 41, 79–93, (1973)) disclose a composite material including Type 5A zeolites in silicone rubber. This material purportedly caused a time lag in achieving steady-state permeation by "immobilizing" various gases due to adsorption to the zeolites. However, after saturation of adsorption sites, permeation of the gases reached steady state. Later, Jia et al. (*J. Membrane Sci.*, 57, 289 (1991)) showed that incorporating silicalite (a hydrophobic crystalline silica-based zeolite, described in U.S. Pat. No. 4,061,724) into silicone rubber provided improved selectivities for oxygen/nitrogen separation. The oxygen/nitrogen selectivity ($P_{O2}/P_{N2}$) increased from the original 2.1 for the silicone rubber to 2.7. Later, Kulprathipanja et al. (U.S. Pat. Nos. 4,740,219 and 5,127,925) introduced silicalite into cellulose acetate and showed slightly enhanced oxygen/nitrogen selectivity (from 2.99 to 3.63). Suier et al. (*J. Membrane Sci.*, 91, 77 (1994)) and Third International Symposium on Separation Technology, Antwerp, Belgium, Elsevier Science B. V., (1994) incorporated Type 4A zeolite into a glassy polymer, polyethersulfone, and also showed enhanced oxygen/nitrogen selectivity (from 3.7 to 4.4). Additional studies have examined zeolites in other polymer matrices and/or have explored surface modification techniques (silane coupling, etc.) to improve adhesion between the dispersed zeolite and polymer matrix: Gutr (*J. Membrane Sci.*, 93, 283 (1994)) and Duval et al. (*J. Membrane Sci.*, 80, 189 (1993) and *J. AppL. Polymer Sci.*, 54, 409 (1994)). Modest or no improvement in oxygen/nitrogen separation was observed.

The art cited above demonstrates the incorporation of various zeolites into various rubbery and glassy polymers for oxygen/nitrogen separation. Although several studies show some enhanced oxygen/nitrogen selectivity, these mixed matrix membranes still do not exhibit the anticipated improvement necessary for commercial application. The most significant work to date was performed by the French Petroleum Institute, where significant selectivity enhancement was reported for methane gas mixtures using flat-sheet membranes containing equal weights of the polyetherimide Ultem® and zeolite 4A (U.S. Pat. No. 4,925,459).

It would be desirable to provide additional devices and processes for separating gaseous components. The present invention provides such devices and processes.

SUMMARY OF THE INVENTION

The present invention is directed to a mixed matrix membrane material (hereinafter "mixed matrix membrane" or "mixed matrix film") comprising molecular sieving entities incorporated into a polymeric membrane. The molecular sieving entities increase the effective permeability of a desirable gas component through the polymeric membrane (and/or decrease the effective permeability of the other gas components), and thereby enhances the gas separation (selectivity) of the polymeric membrane material.

Hereinafter, "enhanced" permeation properties or "enhanced" selectivity refers to this phenomenon. In a preferred embodiment, the membranes are useful for separating carbon dioxide from a gaseous mixture that includes carbon dioxide and methane.

The mixed matrix membrane includes a polymer and small, discrete molecular sieving entities particles encapsulated in the polymer. The mixed matrix membrane has more strength than the polymer alone. The mixed matrix membrane is preferably in the form of a dense film, tube or hollow fiber.

The polymer is a polymer that permits passage of desired gaseous components, in one embodiment carbon dioxide and methane, but at different diffusion rates, such that one of the components, for example either carbon dioxide or methane, diffuses at a faster rate through the polymer. The polymer is generally a rigid, glassy polymer (having high glass transition temperatures, i.e., temperatures above about 150° C.), although rubbery polymers or flexible glassy polymers can be used. Examples of rigid glassy polymers include polysulfones, polycarbonates, cellulosic polymers, polypyrrolones, and polyimides. The polymer preferably has, but need not have, selectivity for one or more of the components being separated.

The molecular sieving entity ("molecular sieve" or "particle") is derived from the pyrolysis of any suitable polymeric material that results in an amorphous carbonized structure with short-range order. The polymeric precursor material for pyrolysis can be prepared in any convenient form such as sheets, tubes, hollow fibers, or powder.

The ratio of particles to polymer is typically between about 10% and 50%, preferably about 20% to 50% by volume. A preferred method for preparing polymeric films is by dispersing the molecular sieving entity in a polymer solution, casting a film of the polymer solution, and evaporating the solvent to form a polymeric film. Optionally, but preferably, the particles are "sized" or "primed" before forming the polymer solution. To maximize dispersion of the particles in the polymers, the polymer solution can be subjected to homogenization and/or ultrasound.

The resulting mixed matrix films can be stacked or formed into tubes or hollow fibers, or other conventional shapes used for gas separations. In one embodiment, the gas separations are used to purify hydrocarbon gases obtained during down-hole drilling operations, either in the hole or above-ground. Using the membranes described herein, helium, hydrogen, hydrogen sulfide, oxygen and/or nitrogen can be separated from natural gas hydrocarbons. These gases can also be separated from carbon dioxide.

A preferred method for preparing hollow fibers is to dissolve the polymer, mix in the particles, and extrude the polymer/molecular sieving entity blend through a tubular capillary nozzle with a core fluid used for the purpose of retaining the hollow fiber shape.

Any gases that differ in size, for example nitrogen and oxygen or ethylene and ethane, can be separated using the membranes described herein. In one embodiment, a gaseous mixture containing methane and carbon dioxide can be enriched in methane by a gas-phase process through the mixed matrix membrane. In other embodiments, the membranes are used to purify helium, hydrogen, hydrogen sulfide, oxygen and/or nitrogen.

BRIEF DESCRIPTION OF THE DRAWINGS

FIG. 1 is a schematic illustration of a gas permeation apparatus for flat membrane films.

DETAILED DESCRIPTION OF THE INVENTION

The present invention is directed to mixed matrix membranes and the use of the membranes in gas phase separations, for example in down-hole drilling operations. For example, one separation is to isolate methane from a mixture that includes methane and carbon dioxide. In a preferred embodiment, the mixed matrix membrane permits carbon dioxide to diffuse through at a faster rate than methane. In other embodiments, hydrogen, helium, hydrogen sulfide, oxygen and/or nitrogen are separated from hydrocarbons and/or carbon dioxide.

Any gases that differ in size, for example nitrogen and oxygen or ethylene and ethane, can be separated using the membranes described herein. Some of the components which can be selectively removed from a gaseous mixture using the membranes described herein include carbon dioxide, oxygen, nitrogen, water vapor, hydrogen sulfide, helium, and other trace gases. Some of the components that can be selectively retained include hydrocarbon gases.

The membranes are particularly suitable for enriching the proportion of methane in a gaseous mixture, preferably including methane and carbon dioxide. Such gaseous mixtures are routinely found in the recycle of methane in Fischer-Tropsch syntheses. Fischer-Tropsch synthesis is well known to those of skill in the art. The membranes can also be used in other gas separation applications.

The mixed matrix membrane includes a polymer and discrete carbon-based molecular sieve particles encapsulated in the polymer. Preferably, the particles are "primed" with the polymer before they are incorporated into the mixed matrix. The resulting mixed matrix membrane has a steady state permeability that differs from the steady state permeability possessed by the polymer.

I. Polymer Selection

An appropriately selected polymer can be used which permits passage of the desired gases to be separated, for example carbon dioxide and methane. Preferably, the polymer permits one or more of the desired gases to permeate through the polymer at different diffusion rates than other components, such that one of the individual gases, for example carbon dioxide, diffuses at a faster rate through the polymer. In a preferred embodiment, the rate at which carbon dioxide passes through the polymer is at least 10 times faster than the rate at which methane passes through the polymer.

Examples of suitable polymers include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly (arylene oxides) such as poly(phenylene oxide) and poly (xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly (vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

It is preferred that the membranes exhibit a carbon dioxide/methane selectivity of at least about 5, more preferably at least about 10, and most preferably at least about 30. Preferably, the polymer is a rigid, glassy polymer as opposed to a rubbery polymer or a flexible glassy polymer. Glassy polymers are differentiated from rubbery polymers by the rate of segmental movement of polymer chains. Polymers in the glassy state do not have the rapid molecular motion that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature (Tg) is the dividing point between the rubbery or glassy state. Above the Tg, the polymer exists in the rubbery state; below the Tg, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures (Tg>150° C).

In rigid, glassy polymers, the diffusion coefficient tends to dominate, and glassy membranes tend to be selective in favor of small, low-boiling molecules. The preferred membranes are made from rigid, glassy polymer materials that will pass carbon dioxide (and nitrogen) preferentially over methane and other light hydrocarbons. Such polymers are well known in the art and are described, for example, in U.S. Pat. Nos. 4,230,463 to Monsanto and 3,567,632 to DuPont. Suitable membrane materials include polyimides, polysulfones and cellulosic polymers.

II. Molecular Sieves and Their Preparation

The molecular sieving entity described herein is a carbon-based molecular sieve. The molecular sieves used in the mixed matrix membranes described herein are preferably prepared from polymeric flat-sheet films. U.S. Pat. No. 4,685,940, the contents of which are hereby incorporated by reference in their entirety, discloses carbon membranes for use in separation processes. These carbon membranes can be used to prepare the particles that are incorporated into the mixed matrix membranes. The resulting particles have a predetermined pore size and function as molecular sieves. Particles formed from the carbon membranes function well even at elevated temperatures. The carbon membranes are produced by the controlled pyrolysis of a suitable polymeric material under conditions that retain the basic integrity of the original geometry.

Suitable materials include polyimides, polyamides, cellulose and derivatives thereof, thermosetting polymers, acrylics, pitch-tar mesophase, and the like. These materials are not limiting, as other materials may be useful for fabricating carbon membranes. Selection of the polymeric material for the carbon membrane for fluid separations may be made on the basis of the heat resistance, solvent resistance, and mechanical strength of the porous separation membrane, as well as other factors dictated by the operating conditions for selective permeation. Especially preferred carbon molecular sieve particles are those prepared from the pyrolysis of aromatic polyimides or cellulosic polymers. Examples of aromatic polyimides are described, for example, in U.S. Pat. Nos. 5,234,471 and 4,690,873. Other patents describing useful polymers which can be subjected to pyrolysis include European Patent Application No. 0 459 623 and U.S. Pat. No. 4,685,940. The contents of each of these patents are hereby incorporated by reference.

The pyrolysis can be generally effected in a wide range of temperatures, between the decomposition temperature of the carbonaceous material and the graphitization temperature (about 3000° C.). Generally, pyrolysis will be effected in the range of from 250 to 2500° C., a preferred range being about 450 to about 800° C.

The carbon membranes contain pores larger than the ultramicropores required for the molecular sieving process. These larger pores connect the ultramicropores that perform the molecular sieving process and allow for high productivities in the dry membrane state. Generally, the higher the final temperature used for the pyrolysis of the polymer, the smaller the pores of the product, and thus the smaller the molecules that can permeate through such membranes.

One of the primary advantages of carbon membranes is their ability to effect gaseous separations at high temperatures. The separation can be effected at any desired temperature, up to temperatures where carbon membranes begin to deteriorate. For non-oxidizing gases, this temperature may be as high as about 1000° C.

The pyrolysis of suitable precursors, generally under conditions conventionally used for the production of carbon fibers, results in a product that has a certain microporosity of molecular dimensions which is responsible for the molecular sieve properties of the carbons.

During the pyrolysis process, the heating is preferably effected under a vacuum atmosphere. Controlled thermal degradation of the polymer precursor results in a pore opening, and thus pre-determined pore-size ranges can be obtained, suitable for the intended separation process.

For the intended use, it is advantageous to obtain fluid separation membranes having pore size and a pore size distribution that effectively separate specific mixtures of fluids. Generally, a pore size distribution of 3–10 Angstroms is suitable and 3–5 Angstroms is preferable for gas separations.

1. The Polymer Precursor Film

A polymeric film is the starting material for preparing the carbon molecular sieve membranes. The polymeric films are formed by solution-casting a polyimide solution using conventional methodology, e.g., casting on a flat, glass surface with a variable-thickness polymer film applicator. Suitable polyimides can be formed, for example, by reacting suitable dianhydrides with diamines. Preferably, aromatic anhydrides and aromatic diamines are used in condensation reactions to form aromatic polyimides. Aromatic polyimides have rigid backbone structures with high melting point and high glass transition temperatures (>250° C.). In a preferred embodiment, an aromatic polyimide resin is used to form a flat film. A preferred chemical structure is shown below.

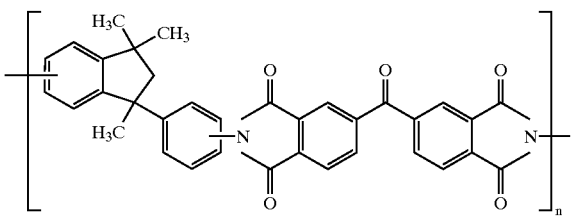

The aromatic polyimide shown above is commercially available from Ciba Specialty Chemicals under the trade name Matrimid® 5218. The Matrimid® 5218 polymer resin is soluble in several solvents, and dichloromethane is a preferred solvent.

2. Pyrolysis of the Precursor Film

Flat polymer films of desired thickness and area can be cut into desired sections and then pyrolyzed. Suitable film thicknesses range from about 0.001 in. to about 0.003 in., preferably about 0.002 in., although thicker or thinner films can be used. The film sections can be placed on a rectangular quartz plate or other similar chemically inert apparatus which can survive the pyrolysis conditions. The quartz plate and films can then be placed in any suitable pyrolysis zone, an example of which is a quartz tube sitting in a Thermcraft® tube furnace. In this type of furnace, the tube is substantially centered so that the polymer films are within the effective heating zone. The pressure during pyrolysis is preferably between about 0.01 mm Hg and about 0.10 mm Hg, more preferably 0.05 mm Hg or lower.

The pyrolysis typically follows a heating cycle. The polymer precursor films are carbonized to a specific structural morphology and carbon composition by controlling the heating protocol with three critical variables: temperature set points, rate at which these temperature set points are reached ("ramp"), and the amount of time maintained at these set points ("soak"). The pyrolysis is generally performed to final temperature set points of 400° C. or greater with soak times ranging from several minutes to several hours. Generally, the pyrolysis results in an amorphous material that is 80 wt. % or greater carbon and possesses a distribution of micropore dimensions with only short-range order of specific pore sizes.

3. Carbon Molecular Sieve Particles

After pyrolysis, the carbon molecular sieve (CMS) membrane films are formed into small particles, typically by pulverizing them into fine particles using conventional crushing or milling processes. Preferably, a ball mill is used to crush the CMS films into small particle sizes (submicron to micron). The following is a typical procedure: The CMS films are loaded into a small steel cylindrical container of approx. 2-in. in diameter and 3-in. in height (SPEX CertiPrep). Stainless steel ball bearings (⅛ in. and ¼ in.) are placed into the container before sealing the container with an O-ring top and cap. The container is next placed inside a ball mixer/mill (SPEX Model 8000), which provides rapid shaking of the vial container and mechanical force for the ball bearings to crush the films into very fine particles. Scanning electron micrographs indicate a submicron-to-micron distribution of particle sizes.

The particle size of the molecular sieves is less than about 5 microns, more preferably between less than about 1 micron. Furthermore, smaller particle sizes (less than about 0.1 micron) can also be obtained by any conventional means, such as an ultrahigh-shearing milling apparatus. In addition, smaller particle sizes may be obtained and the particle size distribution may be narrowed by any conventional means, such as decantation and centrifugation.

4. Dispersing and "Sizing" Carbon Molecular Sieve Particles

In a preferred embodiment, the CMS particles are preconditioned at high temperature in a vacuum oven, for example at a temperature of about 300° C. under vacuum for at least 12 hours. After the preconditioning treatment, a desired quantity of CMS particles can be dispersed into a suitable solvent, preferably one which can be used to dissolve the desired organic polymer material that will be the continuous polymer phase in the eventual mixed matrix membrane. It is particularly preferred that the desired organic polymer is miscible in this solvent. The slurry is well agitated and mixed using any suitable method (e.g., shaker or two parallel rollers, etc.) for preferably between about 30 minutes to an hour. To enhance dispersal and homogeneity, a suitable ultrasonic sonicator can be applied to the slurry, for example, for approximately one minute. In a preferred embodiment, a long stainless steel rod from an ultrasonic high-frequency source generator is used to agitate the slurry. The sonication step breaks up conglomerations of CMS particles.

The CMS particles can optionally, but preferably, be "primed" (or "sized") by adding a small amount of the desired matrix polymer or any suitable "sizing agent" that will be miscible with the organic polymer to be used for the matrix phase. Generally, this small amount of polymer or "sizing agent" is added after the CMS particles have been dispersed in a suitable solvent and sonicated by the ultrasonic agitator source. Optionally, a non-polar non-solvent, in which the polymer or "sizing agent" is insoluble, may be added to the dilute suspension to initiate precipitation of the polymer onto the carbon particles. The "primed" carbon particles may be removed through filtration and dried by any conventional means, for example in a vacuum oven, prior to re-dispersion in the suitable solvent for casting. The small amount of polymer or "sizing agent" provides an initial thin coating (i.e., boundary layer) on the CMS particle surface that will aid in making the particles compatible with the polymer matrix.

In a preferred embodiment, approximately 10% of total polymer material amount to be added for the final mixed matrix membrane is used to "prime" the CMS particles. The slurry is agitated and mixed for preferably between about 6 and 7 hours. After mixing, the remaining amount of polymer to be added is deposited into the slurry. The quantity of CMS particles and the amount of polymer added will determine the "loading" (or solid particle concentration) in the final mixed matrix membrane. Without limiting the invention, the loading of CMS particles is preferably from about 10 vol. % to about 50 vol. %. To achieve the desired viscosity, the polymer solution concentration in the solvent is preferably from about 5 wt. % to about 25 wt. %. Finally, the slurry is again well agitated and mixed by any suitable means for about 12 hours.

This technique of "priming" the particles with a small amount of the polymer before incorporating the particles into a polymer film is believed to make the particles more compatible with the polymer film. It is also believed to promote greater affinity/adhesion between the particles and the polymers and may eliminate defects in the mixed matrix membranes. This "priming" technique is believed to be generally applicable to particles placed in polymer membranes, for example those membranes using zeolites rather than CMS particles. Accordingly, the invention described herein also includes a general method for "priming" particles for inclusion in polymer membranes.

III. Methods for Forming the Mixed Matrix Membrane

The mixed matrix membranes are typically formed by casting the homogeneous slurry containing CMS particles and the desired polymer, as described above. The slurry can be mixed, for example, using homogenizers and/or ultrasound to maximize the dispersion of the particles in the polymer or polymer solution. The casting process is preferably performed by three steps:

(1) pouring the solution onto a flat, horizontal surface (preferably glass surface), (2) slowly and virtually completely evaporating the solvent from the solution to form a solid membrane film, and (3) drying the membrane film. To control the membrane thickness and area, the solution is preferably poured into a metal ring mold. Slow evaporation of the solvent is preferably effected by covering the area and restricting the flux of the evaporating solvent. Generally, evaporation takes about 12 hours to complete, but can take longer depending on the solvent used. The solid membrane film is preferably removed from the flat surface and placed in a vacuum oven to dry. The temperature of the vacuum oven is preferably set from about 50° C. to about 110° C. (or about 50° C. above the normal boiling point of the solvent) to remove remaining solvent and to anneal the final mixed matrix membrane.

The final, dried mixed matrix membrane can be further annealed above its glass transition temperature (Tg). The Tg of the mixed matrix membrane can be determined by any suitable method (e.g., differential scanning calorimetry). The mixed matrix film can be secured on a flat surface and placed in a high temperature vacuum oven. The pressure in the vacuum oven (e.g., Thermcraft furnace tube) is preferably between about 0.01 mm Hg to about 0.10 mm Hg. Preferably, the system is evacuated until the pressure is 0.05 mm Hg or lower. A heating protocol is programmed so that the temperature reaches the Tg of the mixed matrix membrane preferably in about 2 to about 3 hours. The temperature is then raised to preferably about 10° C. to about 30° C., but most preferably about 20° C., above the Tg and maintained at that temperature for about 30 minutes to about one hour. After the heating cycle is complete, the mixed matrix membrane is allowed to cool to ambient temperature under vacuum.

The resulting mixed matrix membrane is an effective membrane material for separation of one or more gaseous components from gaseous mixtures including the desired component(s) and other components. In a non-limiting example of use, the resulting membrane has the ability to separate carbon dioxide from methane, is permeable to these substances, and has adequate strength, heat resistance, durability and solvent resistance to be used in commercial purifications. While not wishing to be bound to a particular theory, the molecular sieves are believed to improve the performance of the mixed matrix membrane by including selective holes/pores with a size that permits carbon dioxide to pass through, but either not permitting methane to pass through, or permitting it to pass through at a significantly slower rate. The molecular sieves should have higher selectivity for the desired gas separation than the original polymer to enhance the performance of the mixed matrix membrane. For the desired gas separation in the mixed matrix membrane, it is preferred that the steady-state permeability of the faster permeating gas component in the molecular sieves be at least equal to that of the faster permeating gas in the original polymer matrix phase. An advantage of the mixed matrix membranes described herein over membranes including primarily the continuous carbon-based molecular sieve membrane films and fibers is that they are significantly less brittle.

The membranes can be used in any convenient form such as sheets, tubes or hollow fibers. Hollow fibers can be preferred, since they provide a relatively large membrane area per unit volume. Sheets can be used to fabricate spiral wound modules familiar to those skilled in the art.

For flat-sheet membranes, the thickness of the mixed matrix selective layer is between about 0.001 and 0.005 inches, preferably about 0.002 inches. In asymmetric hollow fiber form, the thickness of the mixed matrix selective skin layer is preferably about 1000 Angstroms to about 5000 Angstroms. The ratio of sieve particles to polymer is between about 10% and 50%, preferably about 20% to 50% by volume.

IV. Separation Systems Including the Membranes

The membranes may take any form known in the art, for example hollow fibers, tubular shapes, and other membrane shapes. Some other membrane shapes include spiral wound, pleated, flat sheet, or polygonal tubes. Multiple hollow fiber membrane tubes can be preferred for their relatively large fluid contact area. The contact area may be further increased by adding additional tubes or tube contours. Contact may also be increased by altering the gaseous flow by increasing fluid turbulence or swirling.

The preferred glassy materials that provide good gas selectivity, for example carbon dioxide/methane selectivity, tend to have relatively low permeabilities. A preferred form for the membranes is, therefore, integrally skinned or composite asymmetric hollow fibers, which can provide both a very thin selective skin layer and a high packing density, to facilitate use of large membrane areas. Hollow tubes can also be used.

Sheets can be used to fabricate a flat stack permeator that includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are hereby incorporated by reference.

The membranes can be included in a separation system that includes an outer perforated shell surrounding one or more inner tubes that contain the mixed matrix membranes. The shell and the inner tubes can be surrounded with packing to isolate a contaminant collection zone.

In one mode of operation, a gaseous mixture enters the separation system via a containment collection zone through the perforations in the outer perforated shell. The gaseous mixture passes upward through the inner tubes. As the gaseous mixture passes through the inner tubes, one or more components of the mixture permeate out of the inner tubes through the selective membrane and enter the containment collection zone.

The membranes can be included in a cartridge and used for permeating contaminants from a gaseous mixture. The contaminants can permeate out through the membrane, while the desired components continue out the top of the membrane. The membranes may be stacked within a perforated tube to form the inner tubes or may be interconnected to form a self-supporting tube.

Each one of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones. The membranes may be arranged in series or parallel configurations or in combinations thereof depending on the particular application.

The membranes may be removable and replaceable by conventional retrieval technology such as wire line, coil tubing, or pumping. In addition to replacement, the membrane elements may be cleaned in place by pumping gas, liquid, detergent, or other material past the membrane to remove materials accumulated on the membrane surface.

A gas separation system including the membranes described herein may be of a variable length depending on the particular application.

The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

In order to prevent or reduce possibly damaging contact between liquid or particulate contaminates and the membranes, the flowing gaseous mixture may be caused to rotate or swirl within an outer tube. This rotation may be achieved in any known manner, for example using one or more spiral deflectors. A vent may also be provided for removing and/or sampling components removed from the gaseous mixture.

The membranes are preferably durable, resistant to high temperatures, and resistant to exposure to liquids. The materials may be coated, ideally with a polymer, to help prevent fouling and improve durability. Examples of suitable polymers include those described in U.S. Pat. Nos. 5,288,304 and 4,728,345, the contents of which are hereby incorporated by reference. Barrier materials may also be used as a pre-filter for removing particulates and other contaminants which may damage the membranes.

Methods of Forming Hollow Fibers

Hollow fibers can be formed, for example, by extruding a polymer/molecular sieve mixture through a tubular capillary nozzle with a core fluid used for the purpose of retaining the hollow fiber shape. These fibers typically have the diameter of a human hair and offer the advantage of maximizing the surface area per unit volume. Industrial hollow fiber membrane modules typically contain hundreds of thousands of individual hollow fibers.

Specifically, to maximize productivity, the hollow fibers typically include an ultrathin (<2000 Angstroms) "skin" layer on a porous support. Gas separation is accomplished through this selective "skin." This outer "skin" layer may be supported on the same polymer to form an integrally skinned asymmetric hollow fiber membrane. The most advanced membranes have an asymmetric sheath with the selective skin supported on an inexpensive porous core layer (different polymer) to form a composite hollow fiber membrane. This type of device is described in U.S. Pat. No. 5,085,676, the contents of which are hereby incorporated by reference.

Hollow fibers can be employed in bundled arrays potted at either end to form tube sheets and fitted into a pressure vessel thereby isolating the insides of the tubes from the outsides of the tubes. Devices of this type are known in the art. Preferably, the direction of flow in a hollow fiber element will be counter-current rather than co-current or even transverse. Such counter-current flow can be achieved by wrapping the hollow fiber bundle in a spiral wrap of flow-impeding material. This spiral wrap extends from a central mandrel at the center of the bundle and spirals outward to the outer periphery of the bundle. The spiral wrap contains holes along the top and bottom ends whereby gas entering the bundle for tube side flow at one end is partitioned by passage through the holes and forced to flow parallel to the hollow fiber down the channel created by the spiral wrap. This flow direction is counter-current to the direction of flow inside the hollow fiber. At the bottom of the channels the gas re-emerges from the hollow fiber bundle through the holes at the opposite end of the spiral wrap and is directed out of the module.

V. Purification Process

A mixture containing gases to be separated, for example carbon dioxide and methane, can be enriched by a gas-phase process through the mixed matrix membrane, for example, in any of the above-configurations.

The preferred conditions for enriching the mixture involve using a temperature between about 25° C. and 200° C. and a pressure of between about 50 psia and 5000 psia. These conditions can be varied using routine experimentation depending on the feed streams.

Other gas mixtures can be purified with the mixed matrix membrane in any of the above configurations. For example, applications include enrichment of air by nitrogen or oxygen, nitrogen or hydrogen removal from methane streams, or carbon monoxide from syngas streams. The mixed matrix membrane can also be used in hydrogen separation from refinery streams and other process streams, for example from the dehydrogenation reaction effluent in the catalytic dehydrogenation of paraffins. Generally, the mixed matrix membrane may be used in any separation process with gas mixtures involving, for example, hydrogen, nitrogen, methane, carbon dioxide, carbon monoxide, helium, and oxygen. The gases that can be separated are those with kinetic diameters that allow passage through the molecular sieves. The kinetic diameter (also referred to herein as "molecular size") of gas molecules are well known, and the kinetic diameters of voids in molecular sieves are also well known, and are described, for example, in D. W. Breck, *Zeolite Molecular Sieves*, Wiley (1974), the contents of which are hereby incorporated by reference.

Additional Purification

If additional purification is required, the product in the permeate stream can be passed through additional membranes, and/or the product can be purified via distillation using techniques well known to those of skill in the art. Typically, membrane systems may consist of many modules connected in various configurations (See, for example, Prasad et al., *J. Membrane Sci.*, 94, 225–248 (1994), the contents of which are hereby incorporated by reference for background and review). Modules connected in series offer many design possibilities to purify the feed, permeate, and residue streams to increase the separation purity of the streams and to optimize the membrane system performance.

The present invention will be better understood with reference to the following non-limiting examples.

EXAMPLE 1

Carbon Membrane Preparation

A polyimide precursor film of Matrimid® 5218 was prepared in a method presented herein. Its chemical structure has been shown previously. The following steps were used:

1) 3.0 grams of Matrimid® 5218 (Ciba Specialty Chemicals) were added to 20 ml of $CH_2Cl_2$ solvent (Fisher; ACS reagent grade). The solution was well mixed by rotating parallel rollers for about 12 hours.

2) The polymer solution was poured onto a flat, clean horizontal glass surface placed inside a controlled environment (e.g., plastic glove bag). A stainless steel film applicator (Paul N. Gardner Co., 10 mil thickness doctor blade) was used to draw/spread the polymer solution to a uniform thickness for an area of approximately 200 $cm^2$.

3) The solvent from the polymer film slowly evaporated over about a 12-hour time period. The film was about 30 microns in thickness.

4) After drying, the membrane film was annealed at a temperature of about 100° C. for about 12 hours in vacuum.

The dried polymer film of Matrimid® 5218 was cut into 3 rectangular sections of about 37.2 $cm^2$, 39.4 $cm^2$, and 36.0 $cm^2$. The films were placed on a rectangular plate of quartz. The films and quartz plate were placed inside a quartz tube (4.0 in. in outer diameter) in a Thermcraft furnace oven and were pyrolyzed with a heating protocol regulated by an Omega temperature controller. The pyrolysis typically follows a heating cycle as follows: The polymer precursor films are carbonized to a specific structural morphology and carbon composition by controlling the heating protocol with three critical variables: temperature set points, rate at which these temperature set points are reached ("ramp"), and the amount of time maintained at these set points ("soak"). The pyrolysis can be operated with final temperature set points up to about 1000° C., preferably up to at least 500° C. as the final set point temperature, and more preferably from about 550° C. to about 800° C. as the final set point temperature. The pyrolysis "soak" times can be performed with times up to about 10 hours, preferably at least about 1 hour, and more preferably from about 2 hours to about 8 hours. In this Example, the heating cycle was initiated with the following protocol (where SP=set point): start at SP0, which is about 50° C. then heated to SP1, which is about 250° C. at a rate of about 13.3° C./min, then heated to SP2, which is about 785° C. at a rate of about 3.57° C./min, then heated to SP3, which is about 800° C. at a rate of about 0.25° C./min; the SP3, which is about 800° C., is maintained for about 2 hours. After the heating cycle is complete, the system is typically allowed to cool under vacuum. The carbon membranes are removed once the system temperature drops below about 40° C.

After the pyrolysis, the resulting CMS films lost approximately 46.7% in mass with about the following areas: 15.0 $cm^2$, 15.6 $cm^2$, and 14.8 $cm^2$.

EXAMPLE 2

Membrane Evaluation

Permeability measurements of pure carbon molecular sieve flat membranes and flat mixed matrix films can be made using a manometric, or constant volume, method. The apparatus for performing permeation measurements on dense, flat polymeric films are described in O'Brien et al., *J. Membrane Sci.*, 29, 229 (1986) and Costello et al., *Ind. Eng. Chem. Res.*, 31, 2708 (1992), the contents of which are hereby incorporated by reference. The permeation system includes a thermostated chamber containing two receiver volumes for the upstream and downstream, a membrane cell, a MKS Baratron® absolute pressure transducer (0–10 torr) for the downstream, an analog or digital high pressure gauge (0–1000 psia) for the upstream, stainless steel tubing, Nupro® bellows seal valves, and Cajon VCR® metal face seal connections. The chamber temperature can be regulated for permeation measurements ranging from 25° C. to 75° C. The schematic of the permeation testing apparatus is shown in FIG. 1, where 1 is a heated chamber, 2 is a supply gas cylinder, 3 is a vacuum pump, 4 is the feed receiver volume, 5 is the permeate receiver volume, 6 is a pressure transducer, 7 is a membrane cell, 8 is a thermostat-controlled heater, 9 is a fan and 10 is a pressure gauge.

Flat membrane films can be masked with adhesive aluminum masks having a circular, pre-cut, exposed area for permeation through the membrane. Application of 5-minute epoxy at the interface between membrane and the aluminum mask was often necessary to prevent non-selective gas flow between the aluminum mask adhesive and membrane.

After drying the epoxy for approximately 12 to about 24 hours, the masked membrane can be placed in a permeation cell and the permeation system. Both the upstream and downstream sections of the permeation system were evacuated for about 24 hours to 48 hours to remove ("degas") any gases or vapors sorbed into the membrane. Permeation tests of the membrane can be performed by pressurizing the upstream with the desired gas at the desired pressure. The permeation rate can be measured from the pressure rise of the MKS Baratron® pressure transducer and using the known downstream (permeate) volume. The pressure rise is plotted on a strip chart recorder. Following the permeation testing of a given gas, both the upstream and downstream sections were evacuated overnight before permeation testing of the next gas.

EXAMPLE 3

Permeation Testing of CMS Films

A section from the CMS films in Example 1 was cut to an appropriate size and dimension and used in a permeation testing cell (as described in Example 2) to measure the permeabilities for several gases: $CH_4$, $N_2$, $O_2$, and $CO_2$. The upstream side of the CMS membrane film was separately exposed to each of the above gases at a pressure of 50 psia. The downstream side of the CMS membrane was maintained at a vacuum, resulting in differential pressure driving force of 50 psia across the CMS membrane. With the permeation system maintained at a constant temperature of 35° C., the flux of each of the above gases through the membrane was measured with a pressure-rise method. Results are shown in Table 1 with the individual gas permeabilities.

TABLE 1

| Gas Component | Permeability ($10^{-10}$ $cm^3$ (STP) · $cm/cm^2$ · s · cm Hg) |
|---|---|
| $CH_4$ | 0.22 |
| $N_2$ | 1.65 |
| $O_2$ | 22.0 |
| $CO_2$ | 44.0 |

From the permeability values in Table 1, the permeability ratios (selectivity) of the CMS membrane for $O_2/N_2$ and $CO_2/CH_4$ are 13.3 and 200, respectively. Both the selectivity and permeabilities of these gas pairs are significantly higher than those found for any known solution-processable polymer membrane material. Thus, these CMS membranes are good candidates as the disperse phase ("inserts") in a mixed matrix membrane.

EXAMPLE 4

Mixed Matrix Membrane Preparation

The CMS films manufactured from Example 1 and evaluated in Examples 2 and 3 were pulverized into fine particles by a ball mill (SPEX CertiPrep). The CMS films were loaded into a small steel cylindrical container of approx. 2-in. in diameter and 3-in. in height. Stainless steel ball bearings (four ⅛ in. balls and two ½ in. balls) were placed into the container before sealing the container with an O-ring top and cap. After about 1 hour in the ball mill, the resulting, fine CMS particles were removed from the container. Scanning electron micrographs indicate particle sizes ranging from submicron to micron.

A mixed matrix membrane was prepared with the CMS particles as the disperse phase. A high-performance, glassy, engineering polymer called Ultem® 1000 was used as the polymer matrix phase in the mixed matrix membrane. Ultem® 1000 is a polyetherimide and is commercially available from General Electric Plastics. Its chemical structure is shown below.

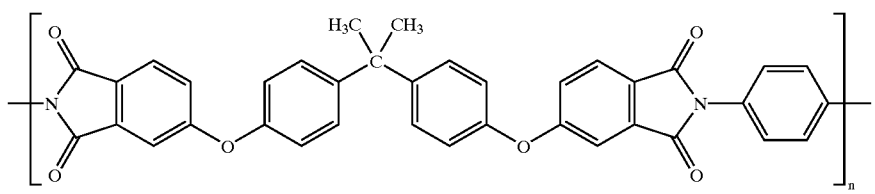

The CMS particles were preconditioned, dispersed and sonicated in $CH_2Cl_2$ solvent, and "primed" with the Ultem® 1000 polymer. The mixed matrix membrane was formed in the following steps:

1) 0.100 grams of CMS particles were added to a 40-ml vial containing about 5 ml of $CH_2Cl_2$. The CMS particles were sonicated in solution for about 1 minute with an ultrasonic rod in the vial. The slurry was well agitated and mixed for about 1 hour on rotating parallel rollers.
2) 0.041 grams of Ultem® 1000 was added to the solution slurry. The solution was well mixed by rotating parallel rollers for about 6 hours. This step is "priming" (or "sizing") the CMS particles.
3) 0.460 grams of Ultem® 1000 was added to the solution to form a solution with 16.6 wt. % or 14.5 vol. % loading of CMS particles. The solution was well mixed by rotating on parallel rollers for about 12 hours.
4) The polymer/CMS solution was poured onto a flat, clean horizontal glass surface placed inside a controlled environment (e.g., plastic glove bag). A stainless steel ring (4-in. diameter) was used to contain the polymer solution. An inverted glass funnel was used to cover the solution. The tip of the funnel was covered with lint-free tissue paper to control the evaporation rate.
5) The solvent from the polymer film slowly evaporated over about a 12-hour time period. The film was about 37 microns in thickness.
6) After drying, the membrane film was annealed at a temperature of about 100° C. for about 12 hours in vacuum.

EXAMPLE 5

Permeation Testing of a Mixed Matrix Film

A section from the Ultem®-CMS mixed matrix film in Example 4 was cut to an appropriate size and dimension and used in a permeation testing cell to measure the permeabilities for several gases: $CH_4$, $N_2$, $O_2$, and $CO_2$, as described by Example 2. The upstream side of the CMS membrane film was separately exposed to each of the above gases at a pressure of 50 psia. The downstream side of the CMS membrane was maintained at a vacuum, resulting in differential pressure driving force of 50 psia across the CMS membrane. With the permeation system maintained at a constant temperature of 35° C., the flux of each of the above gases through the membrane was measured with a pressure-rise method. Results are shown in Table 2 with the individual gas permeabilities of the Ultem®-CMS mixed matrix film and the individual gas permeabilities of a pure Ultem® film (measured in a similar fashion).

TABLE 2

| | Permeability ($10^{-10}$ cm³ (STP) · cm/cm² · s · cm Hg) | |
|---|---|---|
| Gas Component | Ultem ®-CMS mixed matrix film (16.6 wt. % or 14.5 vol. % CMS) | Pure Ultem ® film |
| $CH_4$ | 0.058 | 0.037 |
| $N_2$ | 0.076 | 0.052 |
| $O_2$ | 0.60 | 0.38 |
| $CO_2$ | 2.51 | 1.45 |

From the permeability values in Table 2, the permeability ratios (selectivity) of the Ultem®-CMS mixed matrix film (16.6 wt. % or 14.5 vol. % CMS) membrane for $O_2/N_2$ and $CO_2/CH_4$ are 7.89 and 43.3, respectively. The permeability ratios (selectivity) of an original pure Ultem® membrane for $O_2/N_2$ and $CO_2/CH_4$ are 7.31 and 39.1, respectively. In the Ultem®-CMS mixed matrix film, the $O_2/N_2$ and $CO_2/CH_4$ selectivity has been enhanced by 8% and 10.7%, respectively, over those of the original Ultem® polymer. Furthermore, the $O_2$ and $CO_2$ permeabilities ("fast-gas" components) have been enhanced by 58% and 73.1%, respectively, over those of the original Ultem® polymer.

EXAMPLE 6

Mixed Matrix Membrane Preparation

A mixed matrix membrane was prepared with the CMS particles as the disperse phase. The CMS particles were obtained in a manner similar to that set in Example 1 and pulverized into fine particles with the same procedure described in Example 4.

Another high-performance, glassy, engineering polymer called Matrimid® 5218 was used as the polymer matrix phase in the mixed matrix membrane. Matrimid® 5218 is a polyimide and is commercially available from Ciba Specialty Chemicals. Its chemical structure is shown below.

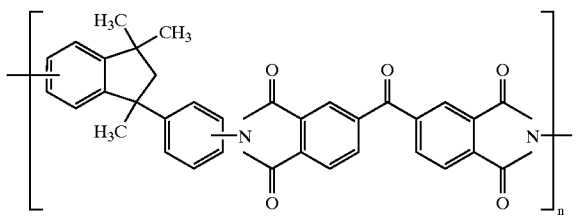

The CMS particles were preconditioned, dispersed and sonicated in $CH_2Cl_2$ solvent, and "primed" with the Matrimid® 5218 polymer. The mixed matrix membrane was formed in the following steps:

1) 0.100 grams of CMS particles were added to a 40-mL vial containing about 5 mL of $CH_2Cl_2$. The CMS particles were sonicated in solution for about 1 minute with an ultrasonic rod in the vial. The slurry was well agitated and mixed for about 1 hour on rotating parallel rollers.
2) 0.040 grams of Matrimid® 5218 was added to the solution slurry. The solution was well mixed by rotating parallel rollers for about 6 hours. This step is "priming" (or "sizing") the CMS particles.
3) 0.460 grams of Matrimid® 5218 was added to the solution to form a solution with 16.7 wt. % or 13.8 vol. % loading of CMS particles. The solution was well mixed by rotating on parallel rollers for about 12 hours.
4) The polymer/CMS solution was poured onto a flat, clean horizontal glass surface placed inside a controlled environment (e.g., plastic glove bag). A stainless steel ring (2.5-in. diameter) was used to contain the polymer solution. An inverted glass funnel was used to cover the solution. The tip of the funnel was covered with lint-free tissue paper to control the evaporation rate.
5) The solvent from the polymer film slowly evaporated over about a 12-hour time period. The film was about 107 microns in thickness.
6) After drying, the membrane film was annealed at a temperature of about 100° C. for about 12 hours in vacuum.

EXAMPLE 7

Permeation of Mixed Matrix Film

A section from the Matrimid®-CMS mixed matrix film in Example 6 was cut to an appropriate size and dimension and used in a permeation testing cell to measure the permeabilities for several gases: $CH_4$, $N_2$, $O_2$, and $CO_2$. The upstream side of the CMS membrane film was separately exposed to each of the above gases at a pressure of 50 psia. The downstream side of the CMS membrane was maintained at a vacuum, resulting in differential pressure driving force of 50 psia across the CMS membrane. With the permeation system maintained at a constant temperature of 35° C., the flux of each of the above gases through the membrane was measured with a pressure-rise method. Results are shown in Table 3 with the individual gas permeabilities of the Matrimid®-CMS mixed matrix film and the individual gas permeabilities of a pure Matrimid® film (measured in a similar fashion).

TABLE 3

| | Permeability ($10^{-10}$ cm$^3$ (STP) · cm/cm$^2$ · s · cm Hg) | |
|---|---|---|
| Gas Component | Matrimid ®-CMS mixed matrix film (16.7 wt. % or 13.8 vol. % CMS) | Pure Matrimid ® film |
| $CH_4$ | 0.28 | 0.28 |
| $N_2$ | 0.37 | 0.32 |
| $O_2$ | 2.46 | 2.11 |
| $CO_2$ | 11.75 | 9.96 |

From the permeability values in Table 3, the permeability ratios (selectivity) of the Matrimid®-CMS mixed matrix (16.7 wt. % or 13.8 vol. % CMS) membrane for $O_2/N_2$ and $CO_2/CH_4$ are 6.65 and 42.0, respectively. The permeability ratios (selectivity) of an original pure Matrimid® membrane for $O_2/N_2$ and $CO_2/CH_4$ are 6.60 and 35.6, respectively. In the Matrimid®-CMS mixed matrix film, the $CO_2/CH_4$ selectivity has been enhanced by 18.0% over that of the original Matrimid® polymer. The $O_2/N_2$ selectivity in the mixed matrix film does not show appreciable enhancement. The $O_2$ and $CO_2$ permeabilities ("fast-gas" components) in the mixed matrix film have been enhanced by 16.6% and 18.0%, respectively, over those of the original Matrimid® polymer.

EXAMPLE 8

Permeation of an Annealed Mixed Matrix Film

The Matrimid®-CMS mixed matrix membrane (16.7 wt. % or 13.8 vol. % CMS) from Example 6 was further subjected to a post-treatment protocol. This post-treatment procedure is described herein. A sample of this film was annealed at 320° C. for 20 minutes and allowed to cool to ambient room temperature for about 12 hours under vacuum.

A section from this new thermally annealed Matrimid®-CMS mixed matrix film was cut to an appropriate size and dimension and used in a permeation testing cell to measure the permeabilities for several gases: $CH_4$, $N_2$, $O_2$, and $CO_2$. The upstream side of the CMS membrane film was separately exposed to each of the above gases at a pressure of 50 psia. The downstream side of the CMS membrane was maintained at a vacuum, resulting in differential pressure driving force of 50 psia across the CMS membrane. With the permeation system maintained at a constant temperature of 35° C., the flux of each of the above gases through the membrane was measured with a pressure-rise method. Results are shown in Table 4 with the individual gas permeabilities of this thermally annealed Matrimid®-CMS mixed matrix film and the individual gas permeabilities of a pure Matrimid® film (measured in a similar fashion).

TABLE 4

| | Permeability ($10^{-10}$ cm$^3$ (STP) · cm/cm$^2$ · s · cm Hg) | |
|---|---|---|
| Gas Component | Matrimid ®-CMS mixed matrix film (16.7 wt. % or 13.8 vol. % CMS) Thermally annealed at 320° C. | Pure Matrimid ® film |
| $CH_4$ | 0.21 | 0.28 |
| $N_2$ | 0.32 | 0.32 |
| $O_2$ | 2.17 | 2.11 |
| $CO_2$ | 9.67 | 9.96 |

From the permeability values in Table 4, the permeability ratios (selectivity) of the "post-treated" Matrimid®-CMS mixed matrix (16.7 wt. % or 13.8 vol. % CMS) membrane for $O_2/N_2$ and $CO_2/CH_4$ are 6.8 and 46.0, respectively. The permeability ratios (selectivity) of an original pure Matrimid® membrane for $O_2/N_2$ and $CO_2/CH_4$ are 6.6 and 35.6, respectively. In this "post-treated" Matrimid®-CMS mixed matrix film, the $CO_2/CH_4$ selectivity has been enhanced by 29.2% over that of the original Matrimid® polymer. The $O_2/N_2$ selectivity in the mixed matrix film shows slight enhancement.

EXAMPLE 9

Mixed Matrix Membrane Preparation

A mixed matrix membrane was prepared with CMS particles as the dispersed phase at a higher loading. In this Example, a high loading of 35.1 wt. % (or 31.4 vol. %) of CMS particles in a polymer matrix is described. The CMS particles were obtained in a manner similar to that set in Example 1 and pulverized into fine particles with the same procedure described in Example 4. The polyetherimide Ultem® 1000 was used as the polymer matrix phase in the mixed matrix membrane. The chemical structure of Ultem® 1000 has been shown previously in Example 4.

The CMS particles were preconditioned, dispersed and sonicated in $CH_2Cl_2$ solvent, and "primed" with the Ultem® 1000 polymer. The mixed matrix membrane was formed in the following steps:

1) 0.306 grams of CMS particles were added to a 40-mL vial containing about 3 mL of $CH_2Cl_2$. The CMS particles were sonicated in solution for about 1 minute with an ultrasonic rod in the vial. The slurry was well agitated and mixed for about 1 hour on rotating parallel rollers.
2) 0.100 grams of Ultem® 1000 was added to the solution slurry. The solution was well mixed by rotating parallel rollers for about 6 hours. This step is "priming" (or "sizing") the CMS particles.
3) 0.466 grams of Ultem® 1000 was added to the solution to form a solution with 35.1 wt. % or 31.4 vol. % loading of CMS particles. The solution was well mixed by rotating parallel rollers for about 12 hours.
4) The polymer/CMS solution was poured onto a flat, clean horizontal glass surface placed inside a controlled environment (e.g., plastic glove bag). The enclosed environment was saturated with $CH_2Cl_2$. A stainless steel film applicator (Paul N. Gardner Co., 10 mil thickness doctor blade) was used to draw/spread the polymer/CMS solution to a uniform thickness. An inverted glass funnel was used to cover the solution. The tip of the funnel was covered with lint-free tissue paper to control the evaporation rate.
5) The solvent from the polymer film slowly evaporated over about a 12-hour time period. The film was about 95 microns in thickness.
6) After drying, the membrane film was annealed at a temperature of about 100° C. for about 12 hours in vacuum.

EXAMPLE 10

Permeation of a Mixed Matrix Film

A section from the high-loading Ultem®-CMS mixed matrix film in Example 9 was cut to an appropriate size and dimension and used in a permeation testing cell to measure the permeabilities for several gases: $CH_4$, $N_2$, $O_2$, and $CO_2$, as described by Example 2. The upstream side of the CMS membrane film was separately exposed to each of the above gases at a pressure of 50 psia. The downstream side of the CMS membrane was maintained at a vacuum, resulting in differential pressure driving force of 50 psia across the CMS membrane. With the permeation system maintained at a constant temperature of 35° C., the flux of each of the above gases through the membrane was measured with a pressure-rise method. Results are shown in Table 5 with the individual gas permeabilities of the high-loading Ultem®-CMS mixed matrix film and the individual gas permeabilities of a pure Ultem® film (measured in a similar fashion).

TABLE 5

| | Permeability ($10^{-10}$ $cm^3$ (STP) · $cm/cm^2$ · s · cm Hg) | |
|---|---|---|
| Gas Component | Ultem ®-CMS mixed matrix film (35.1 wt. % or 31.4 vol. % CMS) | Pure Ultem ® film |
| $CH_4$ | 0.036 | 0.037 |
| $N_2$ | 0.065 | 0.052 |
| $O_2$ | 0.50 | 0.38 |
| $CO_2$ | 1.89 | 1.45 |

From the permeability values in Table 5, the permeability ratios (selectivity) of the Ultem®-CMS mixed matrix film (35.1 wt. % or 31.4 vol. % CMS) membrane for $O/N_2$ and $CO_2/CH_4$ are 7.7 and 52.0, respectively. The permeability ratios (selectivity) of an original pure Ultem® membrane for $O_2/N_2$ and $CO_2/CH_4$ are 7.3 1 and 39.1, respectively. In the Ultem®-CMS mixed matrix film, the $O_2/N_2$ and $CO_2/CH_4$ selectivity has been enhanced by 5% and 33%, respectively, over those of the original Ultem® polymer.

EXAMPLE 11

Permeation of an Annealed Mixed Matrix Film

The high-loading Ultem®-CMS mixed matrix membrane (35.1 wt. % or 31.4 vol. % CMS) from Example 9 was further subjected to a post-treatment protocol. This post-treatment procedure is described herein the methodology of the present invention. A sample of this film was annealed at 250° C. for 2 hours and allowed to cool to ambient room temperature for about 12 hours under vacuum.

A section from this new thermally annealed high-loading Ultem®-CMS mixed matrix film was cut to an appropriate size and dimension and used in a permeation testing cell to measure the permeabilities for several gases: $CH_4$, $N_2$, $O_2$, and $CO_2$. The upstream side of the CMS membrane film was separately exposed to each of the above gases at a pressure of 50 psia. The downstream side of the CMS membrane was maintained at a vacuum, resulting in differential pressure driving force of 50 psia across the CMS membrane. With the permeation system maintained at a constant temperature of 35° C., the flux of each of the above gases through the membrane was measured with a pressure-rise method. Results are shown in Table 6 with the individual gas permeabilities of this now thermally annealed high-loading Ultem®-CMS mixed matrix film and the individual gas permeabilities of a pure Ultem® film (measured in a similar fashion).

TABLE 6

| Gas Component | Permeability ($10^{-10}$ cm$^3$ (STP) · cm/cm$^2$ · s · cm Hg) | |
| --- | --- | --- |
| | Ultem®-CMS mixed matrix film (35.1 wt. % or 31.4 vol. % CMS) Thermally annealed at 250° C. | Pure Ultem® film |
| $CH_4$ | 0.027 | 0.037 |
| $N_2$ | 0.066 | 0.052 |
| $O_2$ | 0.50 | 0.38 |
| $CO_2$ | 1.89 | 1.45 |

From the permeability values in Table 6, the permeability ratios (selectivity) of the "post-treated" high-loading Ultem®-CMS mixed matrix (35.1 wt. % or 31.4 vol. % CMS) membrane for $O_2/N_2$ and $CO_2/CH_4$ are 7.6 and 69.4, respectively. The permeability ratios (selectivity) of an original pure Ultem® membrane for $O_2/N_2$ and $CO_2/CH_4$ are 7.31 and 39.1, respectively. In this "post-treated" high-loading Ultem®-CMS mixed matrix film, the $CO_2/CH_4$ selectivity has been enhanced by 77.5% over that of the original Ultem® polymer. The $O_2/N_2$ selectivity in the mixed matrix film shows slight enhancement.

While the invention has been described in detail with reference to the preferred embodiments thereof, it will be apparent to one skilled in the art that various changes and modifications can be made and equivalents employed, without departing from the present invention.

What is claimed is:

1. A process for separating two gases having different molecular sizes in the range of about 2.5 Angstroms to about 5.0 Angstroms in a feedstream including these two gas components, the process comprising:
   (a) providing a polymer membrane having feed and permeate sides that incorporates carbon-based molecular sieve particles and that is selectively permeable to a first gas component over a second gas component, and
   (b) directing a feedstream including the first and second gas components to the feed side of the membrane and withdrawing a retentate stream depleted in the first gas component and withdrawing a permeate stream enriched in the first gas component from the permeate side of the membrane;
   wherein the selectivity of the first gas component through the particles is greater than the selectivity of the first gas component through the polymer.

2. The process of claim 1, wherein the first gas is carbon dioxide and the second gas is methane.

3. The process of claim 2, wherein the ratio of carbon dioxide/methane in the feedstream is between about 2% and about 80%.

4. The process of claim 1, wherein the membrane is in the form of a film or a hollow fiber.

5. The process of claim 1, wherein the polymer is a rigid, glassy polymer having a glass transition temperature (Tg) greater than 150° C.

6. The process of claim 1, wherein the polymer is selected from the group consisting of substituted and unsubstituted polymers and may be selected from polysulfones; poly (styrenes), including styrene-containing copolymers comprising acrylonitrilestyrene copolymers, styrene-butadiene copolymers and styrene-vinylbenzylhalide copolymers; polycarbonates; cellulosic polymers comprising cellulose acetate-butyrate, cellulose propionate, ethyl cellulose, methyl cellulose, and nitrocellulose; polyamides and polyimides, including aryl polyamides and aryl polyimides; polyethers; polyetherimides; polyetherketones; poly(arylene oxides) comprising poly(phenylene oxide) and poly(xylene oxide); poly(esteramide-diisocyanate); polyurethanes; polyesters (including polyarylates) comprising poly(ethylene terephthalate), poly(alkyl methacrylates), poly(acrylates), poly(phenylene terephthalate); polypyrrolones; polysulfides; polymers from monomers having alpha-olefinic unsaturation other than mentioned above comprising poly (ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters) comprising poly(vinyl acetate) and poly(vinyl propionate), poly(vinyl pyridines), poly(vinyl pyrrolidones), poly(vinyl ethers), poly(vinyl ketones), poly(vinyl aldehydes) comprising poly (vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; and interpolymers, including block interpolymers containing repeating units from the above including terpolymers of acrylonitrile-vinyl bromide-sodium salt of parasulfophenylmethallyl ethers; and grafts and blends containing any of the foregoing, wherein typical substituents providing substituted polymers include halogens comprising fluorine, chlorine and bromine; hydroxyl groups; lower alkyl groups; lower alkoxy groups; monocyclic aryl; and lower acyl groups.

7. The process of claim 1, wherein the carbon-based molecular sieve is formed by pyrolysis of a polymer selected from the group consisting of those listed in claim 5.

8. The process of claim 1, wherein the polymer is selected from the group having a permeation rate for one gas component through the polymer that is at least 2 times faster than the permeation rate for the other gas component through the polymer.

9. The process of claim 1, wherein the volume ratio of particles to polymer is between about 10% and about 50%.

10. The process of claim 1, wherein the feedstream comprises the product stream from a Fischer-Tropsch reaction.

11. The process of claim 1, wherein the membrane is in the form of a film.

12. The process of claim 1, wherein the membrane is in the form of a hollow fiber.

13. The process of claim 1, wherein at least one of the gases to be separated is selected from the group consisting of carbon dioxide, helium, hydrogen, hydrogen sulfide, oxygen and nitrogen.

14. The process of claim 1, wherein the separation is performed down-hole.

15. The method of claim 1, wherein the membrane is subjected to an annealing treatment by heating it above the glass transition temperature of the polymer.

16. The method of claim 15, wherein the annealing is carried out at a temperature between 10 and 30° C. above the glass transition temperature.

17. A mixed matrix membrane comprising:
   (a) a rigid, glassy polymer and
   (b) discrete carbon-based particles dispersed in the polymer;
   wherein the membrane is in the form of a film or a hollow fiber, the thickness of the selective layer of the membrane is between about 1000 Angstroms and about 0.005 in., and the volume ratio of particles to polymer is between about 10% and about 50%.

18. A method of "priming" carbon molecular sieve particles with a polymer, comprising:
   (a) dispersing carbon molecular sieve particles in a suitable solvent,
   (b) adding a small amount of a polymer to the dispersion, where the polymer is soluble in the solvent, and
   (c) adding a non-solvent for the polymer to the dispersion to initiate precipitation of the polymer onto the carbon particles.

19. The method of claim 18, further comprising subjecting the dispersion to ultrasound before step (b).

20. The method of claim 18, further comprising isolating the "primed" carbon particles via filtration.

21. The method of claim 20, further comprising drying the "primed" carbon particles.

* * * * *